UNITED STATES PATENT OFFICE.

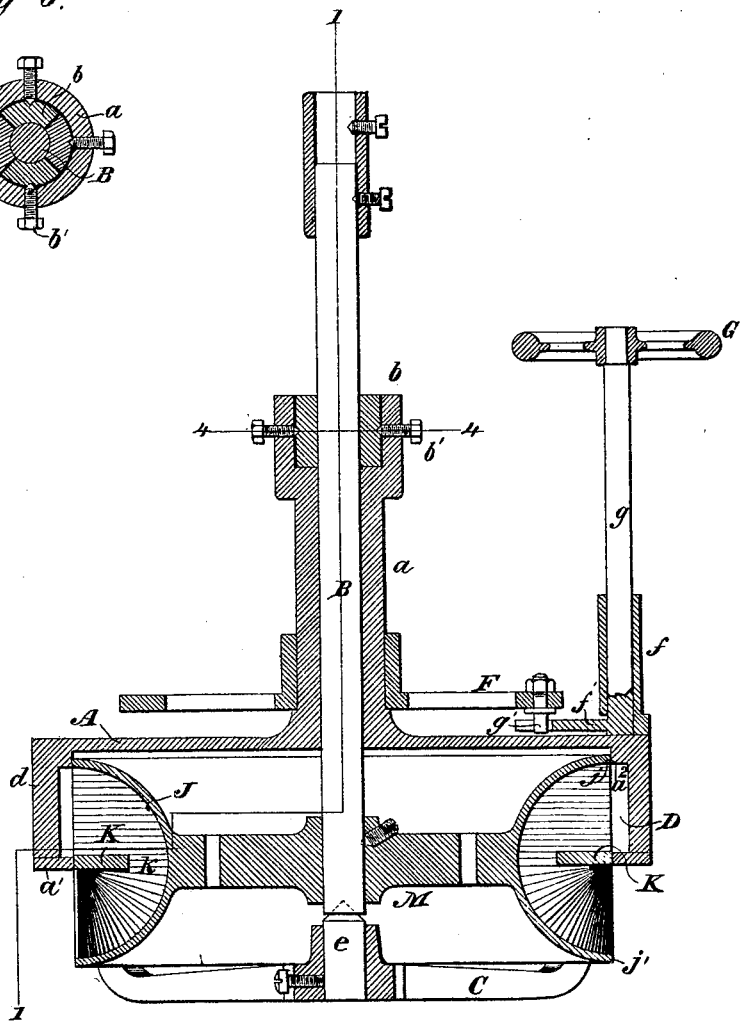

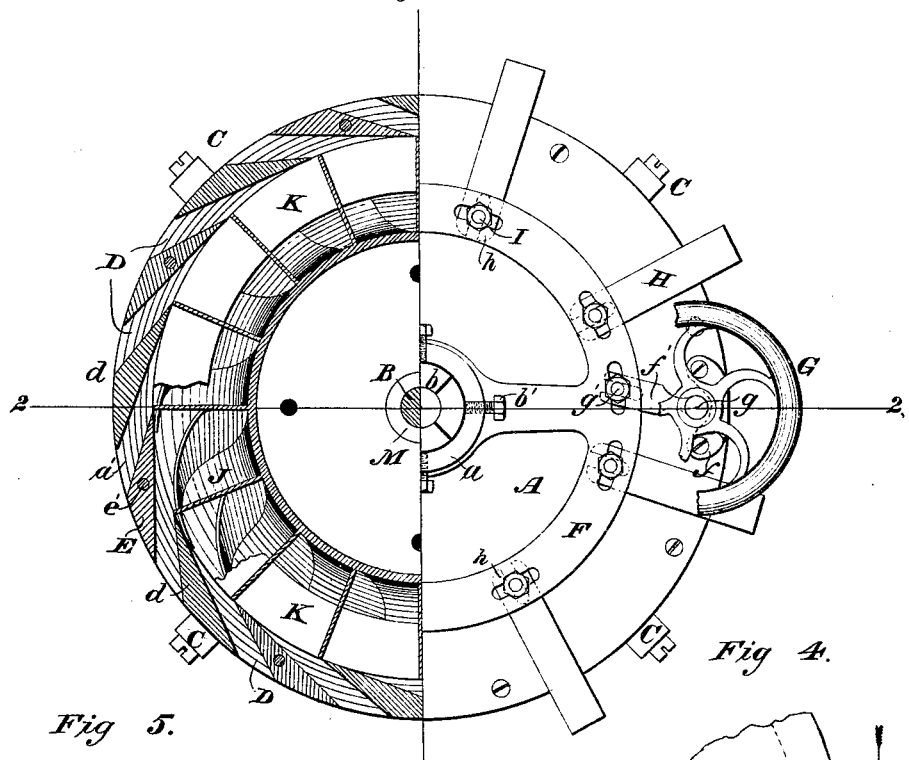
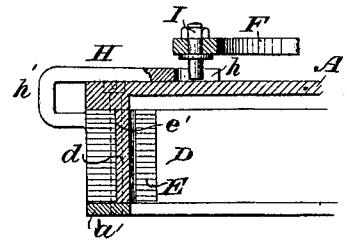
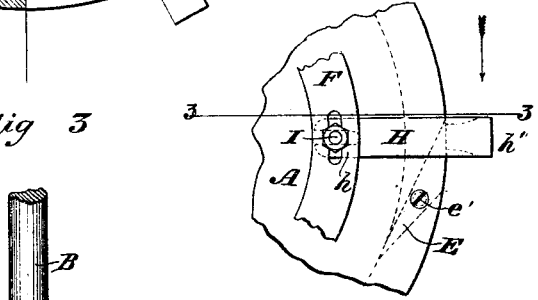
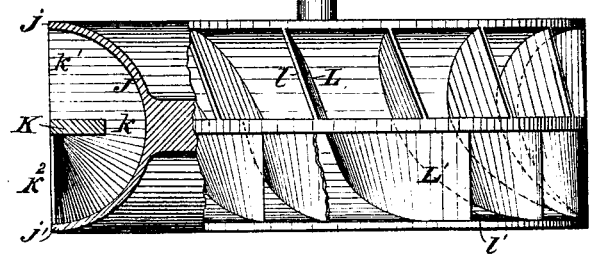

AUSBERT H. WAGNER, OF CHICAGO, ILLINOIS, ASSIGNOR TO ANNA G. WAGNER, OF SAME PLACE.

IMPROVEMENT IN TURBINE WATER-WHEELS.

Specification forming part of Letters Patent No. 183,828, dated October 31, 1876; application filed July 24, 1876.

*To all whom it may concern:*

Be it known that I, AUSBERT H. WAGNER, of Chicago, in the county of Cook and State of Illinois, have invented certain new and useful Improvements in Turbine Water-Wheels, of which the following is a specification:

My invention relates to a horizontal waterwheel of the class in which the water is both admitted to and discharged from the buckets at the periphery of the wheel; and my object mainly is to increase the power of such wheels.

My improvements consist of certain novel constructions of the wheel proper and of the buckets, of certain novel combinations of the wheel casing or cover, its chutes or waterguides, pivoted gates and buckets, and of the casing, the chutes, the gates, and the wheel proper; and, further, consist of certain novel constructions and combinations of parts hereinafter designated.

The subject-matter claimed will hereinafter specifically be set forth.

In the accompanying drawings, Figure 1 represents a vertical central section of my improved wheel on the line 2 2 of Fig. 2; Fig. 2, a view partly in plan and partly in section, on the line 1 1 of Fig. 1, with a portion of the internal central flange of the wheel broken away to show clearly the buckets and wheel proper; Fig. 3, a view in elevation, partly in section, of the wheel proper detached, with one of the buckets partly broken away to leave an unobstructed view of another; Fig. 4, a plan view of a section of the casing or cover, the adjusting or registering ring, and the connection between said ring and one of the gates; Fig. 5, a vertical section on the line 3 3 of Fig 4; and Fig. 6, a transverse section on the line 4 4 of Fig. 1, showing the compensating-bearing of the wheel-spindle in the casing-hub.

A wheel cover or casing, A, is provided, as usual, with a long hub or pipe-box bearing, $a$, through which passes the wheel spindle or shaft B. To compensate wear between the shaft and its bearing, blocks $b$, of brass or other anti-friction metal, are inserted in a socket in the upper end of the hub $a$. These blocks fit against the shaft, and are held in place and adjusted, as occasion requires, by means of set-screws $b'$. The spindle B is stepped at its lower end, so as to turn freely upon a pivot, $e$, secured to the center of a bridge, consisting of arms C, radiating from a common center or hub. These arms are bent upward, as shown, and firmly secured, by screws or otherwise, so as to be readily detachable, to the periphery or vertical outer face of the casing A. The shaft is thus mounted so as to be supported by and turn freely in the casing. Double chutes, or two-part waterinlets D, are formed in the annular vertical face or periphery of the casing A, at suitable intervals between the upper surface of the casing and its lower rim or flange $a^1$. Gates E are pivoted centrally in the two-part chutes, so as to be capable of swinging horizontally on their pivots $e'$, between the partitions or wall $d$, separating the chutes. The swinging register-gates E, it will be seen, correspond in shape with the partitions or solid portions $d$ of the casing-periphery, and divide each chute-opening into two chutes or inlets for the admission of the water, one on either side of the gate, between its face and the side of the partition $d$ respectively adjacent. Owing to the form of the gates, when any one of them is opened or closed, the areas of the waterways, through two chutes, or through the opposite sides of a double chute, are correspondingly increased or diminished. The extreme inner and outer ends or points of a gate, when shut, abut against the sides of the chute-separating walls respectively adjacent thereto, and close the two parts of a double chute, while two "gates" of water can be let on by operating a single gate in one of the double chutes.

The gates are operated by means of a gatering, F, upon the top of the casing A, and turning around its hub $a$, upon which hub the ring is suitably mounted, as shown. The gatering is controlled by means of a crank or hand wheel, G, secured upon top of an upright shaft, $g$, shown as mounted in a removable tubular bracket-bearing, $f$, on the casing A, at or near its edge. The lower end of the shaft $g$ is connected with the gate-regulating ring by means of an inwardly-projecting horizontal arm, $f'$, slotted or forked at its inner end to receive and play upon a bolt or screw, $g'$, adjustable in a slot in the ring. By adjusting the bolt in the slot in the ring, and clamping it in the desired position by its jam-nut, the extent of movement of the ring is regulated at will, so as to open the gates connected with the ring simultaneously to the desired degree, or close them together.

To admit of independent adjustment of the swinging gates E, each one of them is connected with the regulating-ring by an arm, H, supported upon the casing, and forked or longitudinally slotted at its inner end $h$, to receive and play upon a bolt or screw, I, adjustable in a slot in the ring. The outer ends $h'$ of the gate and ring connecting arms are bent downward outside of the casing, and then inward to the gates, each arm being rigidly secured to its respective gate.

By this construction any one or more gates can be adjusted independently of the rest, so that the wheel may be used by admitting water to a part only of the buckets, the gates to the remaining buckets being closed. When the gates are closed the outer bent ends of the arms H project into the chute-opening, thus allowing the gates to shut tight.

The wheel proper is of peculiar construction. (See Figs. 1, 2, and 3.) It has a concave periphery, J, curved from its top rim $j$ to the bottom rim $j'$, and presenting the form of a semicircle in cross-section. The face or periphery of the wheel is partially divided into an upper and a lower section by a horizontal flange or ring, K, the outer edge of which is in the same vertical plane as the wheel-rims $j$ and $j'$, while the inner edge of the flange terminates at about one-half, or rather less than half, the distance from the extreme inner point of the concavity in the wheel-face to a vertical line drawn from rim to rim, or from the top to the bottom edges of the wheel-face.

Thus it will be seen a water-way, $k$, of about one-half (or a little less than one-half) the respective areas of the inlet $k^1$ above the flange and the outlet $k^2$ below the flange, is formed between this peripheral inlet and outlet. The bottom flange $a^1$ of the face of the casing A abuts against the outer edge of the flange K, and the wheel is prevented from wabbling when in operation by the contact of these flanges and the bearing of the upper rim $j$ of the wheel against the internal shoulder $a^2$ of the casing. The buckets are of peculiar shape, and are twice as many in number as the double chutes and gates. In this instance sixteen buckets are shown, while there are but eight gates and eight double chutes, making sixteen single chute-openings. Thus each of the gates and double chutes supply two buckets with water. Each bucket is two-part in form, and is constructed with a curved top, back, and bottom, corresponding exactly with the curve of the periphery of the wheel, against which these parts of the bucket fit closely, as shown. Their edges $l$ $l'$ are straight, and they each are divided by the external annular flange K into upper direct-acting and lower reacting portions L L'. The upper portions L, throughout their entire surfaces, are inclined to the axis of the wheel and radial thereto, while the lower portions L' are for the greater part vertical and curved tangentially to the axis. Immediately beneath the flange K the change in form between the upper and lower parts of the bucket begins; and it is accomplished by giving the buckets a gradual horizontal bend or twist, as shown in the drawings.

By thus forming the buckets it will be seen that the water, when admitted by the chutes at the wheel's periphery, first acts directly by impact or percussive force upon the upper portion of the bucket with power governed by its velocity; then by passing down the inclined face or central portion of the bucket, and, finally, by the centrifugal force exerted upon the lower portion of the bucket by the natural tendency of the water to escape, as it finally does, at the periphery. By narrowing the water-way between the upper and lower portions of the buckets the water is drawn through and escapes from the wheel with great force, and is caused to operate with most beneficial effect at the points farthest from the axis of rotation of the wheel, (where it will do the most good,) both when entering and when at and being discharged from the periphery of the wheel. The wheel-hub M is fastened in suitable manner to the shaft B, and openings between the hub and periphery allow the escape of any water which may enter over the rim of the wheel.

Practical tests have demonstrated a great increase of power over wheels of the ordinary construction to be the result of using my multiform buckets and concave-faced wheel described.

I claim as my invention—

1. The water-wheel proper, constructed as hereinbefore described, with a concave periphery, having its projecting upper and lower rims in the same vertical plane, and a horizontal annular flange arranged midway between said rims, and partially dividing the concavity in the wheel into two equal parts, with a contracted water-way between them.

2. A two-part water-wheel bucket, constructed substantially as hereinbefore described, with a curved top, back, and bottom, an inclined upper portion, a vertical lower portion, and a horizontal twist or bend between the upper and lower portions.

3. The combination, substantially as hereinbefore set forth, of the horizontal concave-faced wheel, its annular dividing-flange, and the two-part buckets, having their upper portions inclined to the axis of the wheel and radial thereto, and their lower portions, for the greater part, vertical and tangential to the axis.

4. The combination of the wheel-casing, having a vertical face or periphery, the double chutes therein, the partitions between the chutes, the series of swinging gates pivoted in the double chutes, and formed to correspond with the partitions separating the chutes, and the buckets, these members being constructed and operating substantially as set forth, whereby each gate controls a two-part or double chute, and regulates the admission of water to two buckets.

5. The combination of the casing, having an annular vertical face or periphery, the chutes therein, the series of pivoted gates, the gate-regulating ring, the arms connecting the gates and regulating-ring, and the adjusting-bolts, working in slots in the regulating-ring and in the connecting-arms, these members being constructed and operating as and for the purpose set forth.

6. The combination of the casing, the regulating-ring, its operating-shaft, the arm adjustably connecting said shaft and the adjusting-ring, the swinging gates, and the independently-adjustable connections between the gates and the regulating-ring, these members being constructed and operating substantially as set forth, whereby the gates are rendered both independently and simultaneously adjustable.

7. The combination, substantially as hereinbefore set forth, of the casing, having a vertical face or periphery, a bottom flange, $a^1$, and an internal shoulder, $a^2$, and the wheel, having a concave periphery, an upper rim bearing against the internal shoulder of the casing, and a central annular flange bearing against the bottom flange of the casing.

In testimony whereof I have hereunto subscribed my name.

AUSBERT H. WAGNER.

Witnesses:
M. W. ROBINSON,
L. V. FERRIS.